US 8,055,835 B2

(12) United States Patent
Ash et al.

(10) Patent No.: US 8,055,835 B2
(45) Date of Patent: Nov. 8, 2011

(54) APPARATUS, SYSTEM, AND METHOD FOR MIGRATING WEAR SPOTS

(75) Inventors: Kevin John Ash, Tucson, AZ (US);
Benjamin Jay Donie, Tucson, AZ (US);
Andreas Bernardus Mattias Koster,
Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 12/144,427

(22) Filed: Jun. 23, 2008

(65) Prior Publication Data
US 2009/0319743 A1 Dec. 24, 2009

(51) Int. Cl.
*G06F 12/16* (2006.01)
(52) U.S. Cl. ........................................ 711/103; 711/165
(58) Field of Classification Search ........................ None
See application file for complete search history.

(56) References Cited

U.S. PATENT DOCUMENTS

| | | | |
|---|---|---|---|
| 5,873,116 A | 2/1999 | Van Fleet | |
| 5,937,428 A | 8/1999 | Jantz | |
| 6,311,257 B1 | 10/2001 | Fitzgerald et al. | |
| 6,507,893 B2 | 1/2003 | Dawkins et al. | |
| 6,961,727 B2 | 11/2005 | McBrearty et al. | |
| 7,120,729 B2 | 10/2006 | Gonzalez et al. | |
| 7,185,163 B1 | 2/2007 | Knight et al. | |
| 7,277,982 B2 | 10/2007 | Calvignac et al. | |
| 7,398,302 B2 | 7/2008 | Yamagami et al. | |
| 7,530,073 B1 | 5/2009 | Shutt et al. | |
| 7,774,572 B2 | 8/2010 | Yokohata et al. | |
| 7,818,499 B2 | 10/2010 | Arakawa et al. | |
| 2002/0133681 A1 | 9/2002 | McBrearty et al. | |
| 2003/0115434 A1 | 6/2003 | Mahalingam et al. | |
| 2004/0215713 A1 | 10/2004 | Bish et al. | |
| 2004/0243692 A1 | 12/2004 | Arnold et al. | |
| 2006/0069867 A1 | 3/2006 | Arndt et al. | |
| 2006/0143419 A1 | 6/2006 | Tulyani | |
| 2006/0161678 A1 | 7/2006 | Bopardikar et al. | |
| 2006/0206603 A1 | 9/2006 | Rajan et al. | |
| 2007/0118710 A1 | 5/2007 | Yamakawa et al. | |
| 2007/0130423 A1 | 6/2007 | Liu et al. | |
| 2007/0150687 A1 | 6/2007 | Chet et al. | |
| 2007/0260834 A1 | 11/2007 | Kavuri et al. | |
| 2008/0059718 A1 | 3/2008 | Tajima et al. | |
| 2009/0006734 A1 | 1/2009 | Kishi et al. | |
| 2009/0172255 A1* | 7/2009 | Yeh et al. | 711/103 |
| 2009/0193174 A1 | 7/2009 | Reid | |
| 2009/0216910 A1 | 8/2009 | Duchesneau | |

(Continued)

OTHER PUBLICATIONS

Jitu J. Makwana et al., "A Nonvolatile Memory Overview", http://aplawrence.com/Makwana/nonvolmem.html, Oct. 2004.

(Continued)

*Primary Examiner* — Than Nguyen
(74) *Attorney, Agent, or Firm* — Kunzler Needham Massey & Thorpe

(57) ABSTRACT

An apparatus, system, and method are disclosed for migrating wear spots in solid-state drives. A count module counts lifetime write cycles for logical units of a plurality of solid-state memories. Each logical unit has a logical address. An identification module identifies a wear spot on a first logical unit of a first solid-state memory if a count for the first logical unit exceeds a cycle threshold. A migration module dynamically migrates data of the first logical unit to a second solid-state memory, wherein the data is continuously available at an original logical address.

20 Claims, 7 Drawing Sheets

U.S. PATENT DOCUMENTS

2009/0240898 A1* 9/2009 Abe et al. .................. 711/154
2009/0248979 A1* 10/2009 Kobayashi et al. ......... 711/114
2009/0300277 A1* 12/2009 Jeddeloh .................... 711/104
2010/0115175 A9* 5/2010 Zhuang et al. ............. 711/103

OTHER PUBLICATIONS

"Flash Memory", Wikipedia, http://ermikipedia.org/wiki/Flash_memory#NAND_memories, downloaded on Oct. 29, 2010.

"Wear Leveling", Wikipedia, http://en.wikipedia.org.wiki/Wear_leveling, downloaded on Oct. 29, 2010.

U.S. Appl. No. 12/027,152, Office Action from the USPTO, Nov. 18, 2010.

Vijay Sundaram et al., "Efficient Data Migration in Self-Managing Storage Systems", Autonomic Computing, 2006, ICAC '06, IEEE International Conference on Jun. 13-16, pp. 297-300.

"Integrated Disk Management to Provide High Performance Logical Drives for Multiple Accesses and Large Sequential Accesses to a Multi-Disk Storage Subsystem", TBD v36 n6A, pp. 553-556.

Jitu J. Makwana et al., "A Nonvolatile Memory Overview", http://aplawrence.com/Makwana/nonvolmem.html.

"Flash Memory", Wikipedia, http://en.wikipedia.org/wiki/Flash_memory#NAND_memories.

"Wear Leveling", Wikipedia, http://en.wikipedia.org.wiki/Wear_leveling.

U.S. Appl. No. 12/027,152, Office Action from the USPTO, Jul. 8, 2010.

U.S. Appl. No. 12/027,140, Office Action from the USPTO, Jun. 25, 2010.

* cited by examiner

APPARATUS, SYSTEM, AND METHOD FOR MIGRATING WEAR SPOTS

BACKGROUND OF THE INVENTION

1. Field of the Invention

This invention relates to wear spots and more particularly relates to migrating wear spots in solid-state drives.

2. Description of the Related Art

Storage systems are increasingly using solid-state memories to store data. A solid-state memory may be a semiconductor memory device such as Flash memory. The solid-state memories may be incorporated into a solid-state drive. The solid-state drive may include a plurality of solid-state memories.

Solid-state memories and solid-state drives often have very low access latencies. In addition, solid-state memories and solid-state drives may suffer fewer mechanical failures such as those that are common to hard disk drives.

Data may be written to a solid-state memory such as a Flash solid-state memory by first erasing a data block of the solid-state memory. The entire data block is then written with the modified data. Thus, changing one word in a data block requires that the entire data block be rewritten.

Unfortunately, solid-state memories typically may only be erased and rewritten a finite number of times. For example, a NAND gate flash memory may be designed to be reliably erased and rewritten 100,000 to 300,000 times.

When data is stored in a storage device such as a solid-state drive, certain files and portions of files may be repeatedly modified while other files and portions of files remain relatively static. High use files and portions of files may be referred to as wear spots. The development of wear spots in a solid-state drive may limit the life of the solid-state drive to the relatively short life of the wear spots.

SUMMARY OF THE INVENTION

From the foregoing discussion, there is a need for an apparatus, system, and method that migrate wear spots. Beneficially, such an apparatus, system, and method would migrate the wear spots and in turn would extend the life of one or more solid-state drives.

The present invention has been developed in response to the present state of the art, and in particular, in response to the problems and needs in the art that have not yet been fully solved by currently available storage management apparatus and methods for migrating wear spots. Accordingly, the present invention has been developed to provide an apparatus, system, and method to migrate wear spots that overcome many or all of the above-discussed shortcomings in the art.

The apparatus to migrate wear spots is provided with a plurality of modules configured to functionally execute the steps of counting lifetime write cycles, identifying a wear spot, and dynamically migrating data. These modules in the described embodiments include a count module, a migration module, and an identification module.

The count module counts lifetime write cycles for logical units of a plurality of solid-state memories. Each logical unit has a logical address.

The identification module identifies a wear spot on a first logical unit of a first solid-state memory if a count for the first logical unit exceeds a cycle threshold. The migration module dynamically migrates data of the first logical unit to a second solid-state memory. The data is continuously available at an original logical address.

A system of the present invention is also presented to migrate wear spots. In particular, the system, in one embodiment, includes a plurality of solid-state memories, a count module, a migration module, and an identification module.

The count module counts lifetime write cycles for logical units of a plurality of solid-state memories. Each logical unit has a logical address.

The identification module identifies a wear spot on a first logical unit of a first solid-state memory if a count for the first logical unit exceeds a cycle threshold. The migration module dynamically migrates data of the first logical unit to a second solid-state memory. The data is continuously available at an original logical address.

A method of the present invention is also presented for migrating wear spots. The method in the disclosed embodiments substantially includes the steps to carry out the functions presented above with respect to the operation of the described apparatus and system. In one embodiment, the method includes counting lifetime write cycles, identifying a wear spot, and dynamically migrating data.

A count module counts lifetime write cycles for logical units of a plurality of solid-state memories. Each logical unit has a logical address.

An identification module identifies a wear spot on a first logical unit of a first solid-state memory if a count for the first logical unit exceeds a cycle threshold. A migration module dynamically migrates data of the first logical unit to a second solid-state memory, wherein the data is continuously available at an original logical address.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention identifies wear spots in a first solid-state memory and on identification of the wear spots, migrates data of the first solid-state memory to the second solid-state memory. Thus, the present invention would beneficially extend life of one or more solid-state drives of a data storage system. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
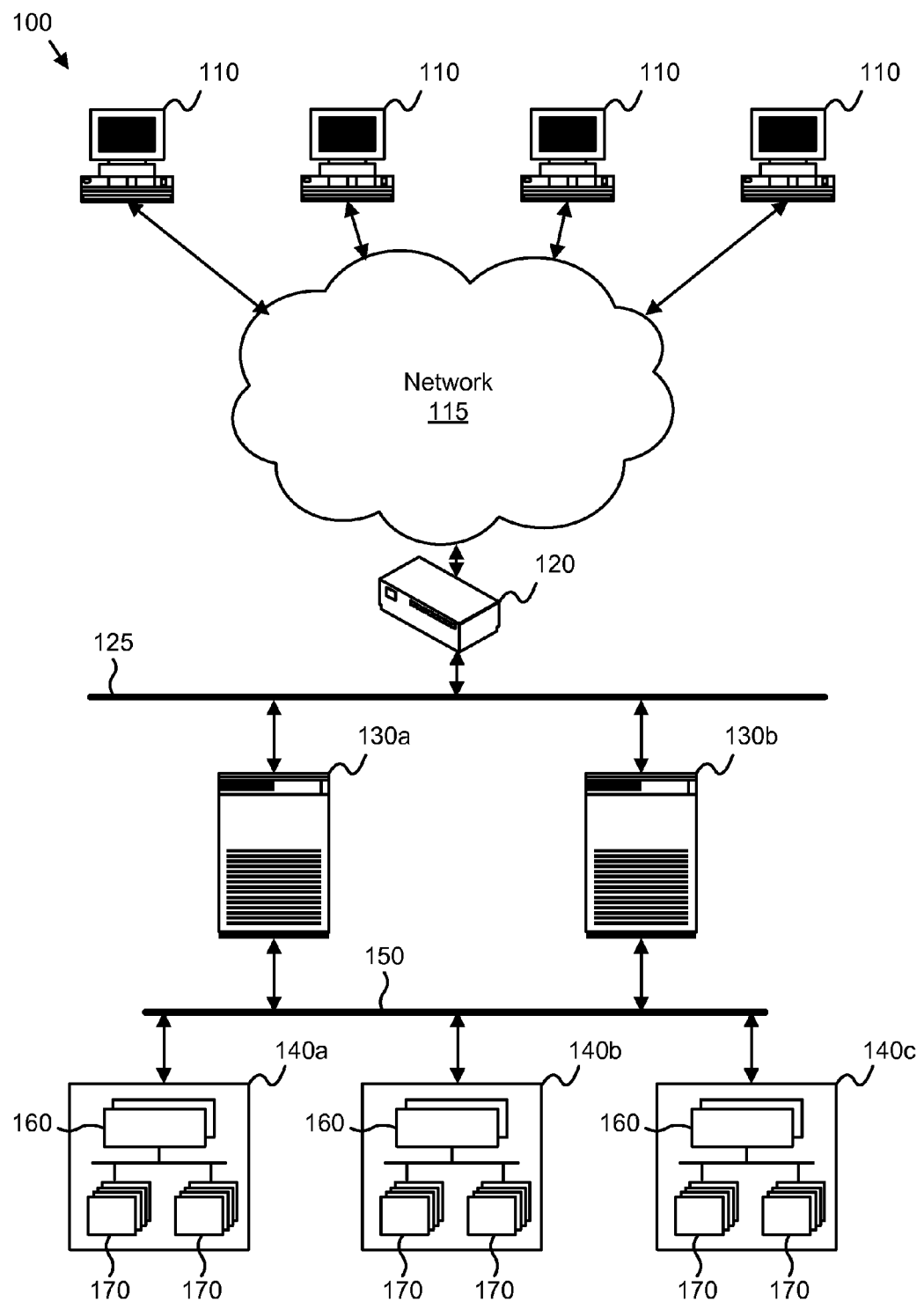
FIG. 1 is a schematic diagram illustrating one embodiment of a data processing system in accordance with the present invention.

FIG. 1 is a schematic block diagram illustrating one embodiment of a data processing system (DPS) 100 in accordance with the present invention. The DPS 100 includes one or more host computers 110, a network 115, a router 120, an internal network 125, one or more servers 130, a storage communications channel 150, and one or more storage subsystems 140.

As used herein, the host computers 110 are referred to as hosts 110. The servers 130 may be configured as mainframe computers, blade centers comprising multiple blade servers, and the like. Although for simplicity four hosts 110, one network 115, one router 120, one internal network 125, two servers 130, one storage communications channel 150, and three storage subsystems 140 are shown, any number of hosts 110, networks 115, routers 120, internal networks 125, servers 130, storage communications channels 150, and storage subsystems 140 may be employed. One of skill in the art will also readily recognize that the DPS 100 could include other data processing devices such as bridges, scanners, printers, and the like.

The network 115 may be in communication with the plurality of hosts 110 and with the plurality of storage subsystems 140a-c through the router 120 and the internal network 125. The network 115 may be configured as a wireless network and/or a wired a network. For example, the network 115 may be in communication either through cables, wires, optical fibers, or wireless with the plurality of hosts 110 and the plurality of storage subsystems 140a-c. The network 115 may be selected from a local area network (LAN), a wide area network (WAN), a storage area network (SAN), or the like.

Each storage subsystem 140 includes one or more storage controllers 160 and one or more solid-state drives 170. The solid-state drives 170 may include semiconductor memory devices such as a plurality of NAND Flash memories, NOR Flash memories, micromechanical storage devices, and/or the like.

In one embodiment, the DPS 100 provides data storage and data manipulation services for the plurality of hosts 110. For example, a host 110 may access, write, or erase data stored on the solid-state drive 170 of the first storage subsystem 140a by communicating a request through the network 115, the router 120, the internal network 125, the server 130, and the storage communications channel 150 to the storage controller 160 for the solid-state drives 170. In addition, the storage controller 160 may retrieve, write, or erase the data on the solid-state drives 170 and communicate the data to the host 110 through the network 115. In one embodiment, the server 130 may execute a database application used by the host 110 to access the data.

The solid-state memories and the solid-state drives 170 may suffer fewer mechanical failures such as those that are common to hard disk drives. However, one or more hosts 110 may access, write, or erase data stored on a portion of the solid-state drives 170 excessively. As a result, there may be wear spots in the solid-state drives 170. The development of wear spots in the solid-state drive 170 may limit the life of that particular solid-state drive 170. The present invention mitigates wear spots to one or more solid-state drives 170 as will be described hereafter.

Figure 2:
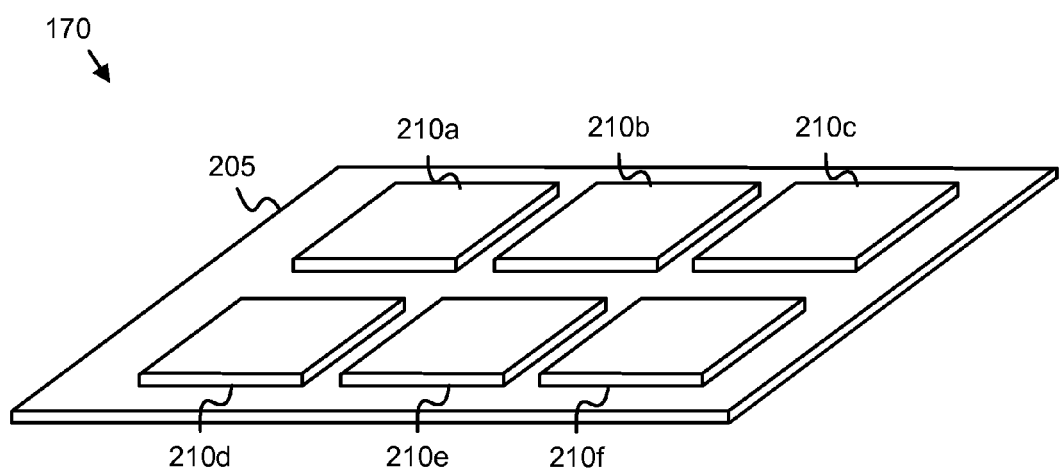
FIG. 2 is a perspective view illustrating one embodiment of a solid-state drive in accordance with the present invention.

FIG. 2 is a perspective view illustrating one embodiment of a solid-state drive 170 in accordance with the present invention. The solid-state drive 170 may be embodied in the storage subsystem 140 of the DPS 100. The description of the solid-state drive 170 refers to elements of FIG. 1, like numbers referring to like elements. The solid-state drive 170 includes a printed circuit board (PCB) 205 and a plurality of solid-state Flash memories 210a-f. Although, for simplicity, the solid-state drive 170 is shown with one (1) PCB 205 and six (6) solid-state Flash memories 210a-f, any number of solid-state Flash memories 210 may be employed.

The solid-state drive 170 may be configured as a data storage device that uses the plurality of solid-state Flash memories 210a-f to store persistent data. For example, a high speed and large storage capacity solid-state drive 170 of sixty-four gigabytes (64 GB) may be configured and available from various vendors.

The solid-state drive 170 may be in communication with a common drive interface (not shown) such as an integrated drive electronics (IDE) interface, small computer small interface (SCSI), a Fibre Channel interface, or the like to communicate with the hosts 110. The drive interface may present each solid-state drive 170 as single mass storage unit to the hosts 110.

The PCB 205 may be wide enough to receive the plurality of packaged solid-state Flash memories 210*a-f*. Alternatively, the PCB 205 may further include one or more sub-boards. Each sub-board may receive some of the packaged solid-state Flash memories 210*a-f* in desired number.

Each solid-state Flash memory 210 may be configured as a NAND or NOR Flash memory. Further, each solid-state Flash memory 210 may be an array of a plurality of memory cells. Each memory cell may be an Integrated Circuit (IC) chip formed of a plurality of transistors. Each memory cell may have at least a portion of a gate that may electrically float. A charge on the electrically floating gate may thus control the conduction of the transistor of the memory cell. The charge may store a value as is well known to those of skills in the art. For example, each solid-state Flash memory 210 may be an array of the plurality of memory cells storing one gigabyte (1 GB) of data.

In one more embodiment, the plurality of solid-state drives 170 of the DPS 100 may be displayed and presented to the hosts 110 as a single storage unit such as a virtual hard disk drive, or one or more logical volumes, or the like. Each drive 170 may have a file system such as file allocation table (FAT), new technology file system (NTFS), high performance file system (HPFS), or the like to store the data in files and folders.

Each solid-state Flash memory 210*a-f* may be configured with a NAND or a NOR gate as is well known to those of skill in the art. The solid-state Flash memories 210*a-f* configured with the NAND gate may use tunnel injection for writing and tunnel release for erasing the data. The NAND gate may be cycled through a write or an erase cycle to write or erase the data. During each write or erase cycle a gate oxide layer may degrade due to breakdown or trap-up of the gate oxide layer.

The solid-state Flash memories 210 may be divided into one or more physical segments. Data on the solid-state Flash memory 210 may be accessible through various control input/output commands, particularly read and write commands from one or more hosts 110.

Figure 3:
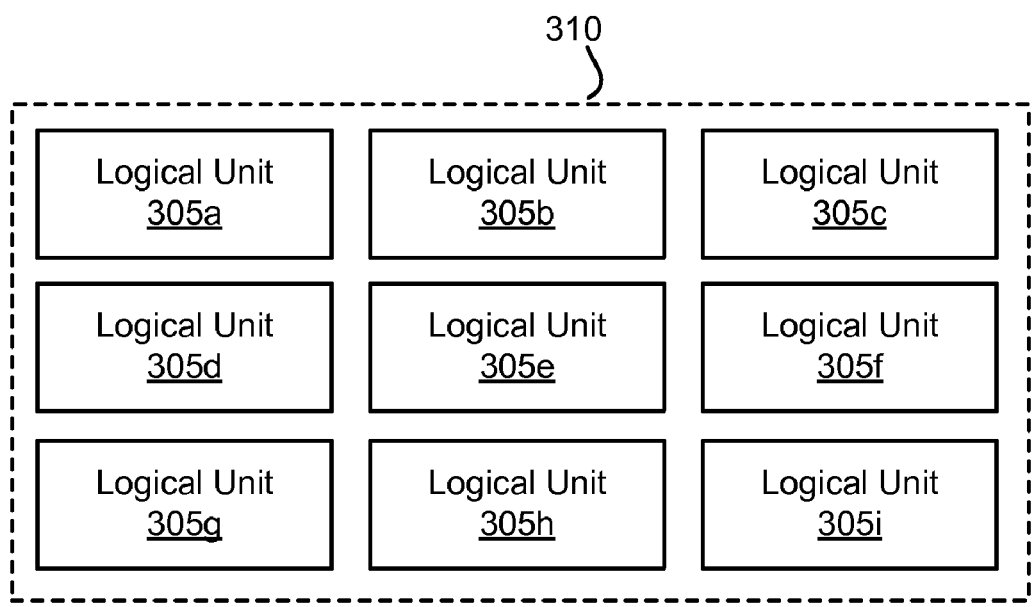
FIG. 3 is a schematic block diagram illustrating one embodiment of an array of logical units of the present invention.

FIG. 3 is a schematic block diagram illustrating one embodiment of a logical array 310 of the present invention. The logical array 310 includes a plurality of logical units 305*a-i*. The description of the logical array 310 refers to elements of FIGS. 1-2, like numbers referring to like elements. Although, for simplicity, the logical array 310 is shown with nine (9) logical units 305*a-i*, any number logical units 305 may be employed.

The plurality of logical units 305*a-i* of the plurality of solid-state memories 210*a-f* are shown included in the logical array 310. Each logical unit 305*a-i* may comprise one or more physical segments of fixed or variable memory size. For example, each logical unit 305*a-i* may comprise four (4) physical segments of one-megabyte (1 MB) of one or more solid-state memories 210. In addition, each logical unit 305 may not be restricted to any solid-state drive 170. Thus, the logical unit 305 of the array 310 may include a plurality of physical segments from the plurality of solid-state drives 170.

In an embodiment, each logical unit 305 is configured as an extent. Each logical unit 305 configured as the extent may be of uniform size and/or of a variable size. The plurality of logical units 305*a-i* may also be merged or split by an administrator or automatically by a management program.

For example, the plurality of physical segments of the plurality of solid-state drives 170 may be grouped/pooled into a desired number of physical extents (PEs). In a particular example, each physical segment may be equivalent to one PE.

Each PE may be mapped one-to-one to the logical unit 305 configured as the extent. The plurality of logical units 305*a-i* configured as the plurality of extents may be pooled into the logical array 310. The one-to-one mapping of the PEs to the logical units 305 may help to achieve location independence storage of the data by abstracting the physical location of the data.

In another embodiment, one or more logical units 305*a-i* are configured as a logical volume. For example, each logical unit 305*a-i* may be concatenated together into one or more logical volumes. A file system may be mounted on the logical volume. The mounted file system may allow storage of the data in a plurality of blocks as is well known to those of skill in the art.

Alternately, each logical unit 305*a-i* is configured as an array logical block address. For example, each logical unit 305*a-i* is configured as an array logical block address for a block of the data.

A computer program may record a consistent view of each write or erase cycle to the plurality of logical units 305*a-i*. The information of each write/erase cycle may be stored as metadata in a write/erase table. For example, counters may be implemented that may keep track of each write or erase cycle of each logical unit 305.

Some logical units 305 may be heavily utilized by writing data blocks to or erasing data blocks from a physical segment. For example, the fourth logical unit 305*d* may store an often written or erased portion of a database. Thus, multiple hosts 110 may write or erase the fourth logical unit 305*d*, resulting in a wear spot in the solid-state drive 170 that corresponds to the fourth logical unit 305*d* of the logical array 310. The present invention migrates data of the logical unit 305 to reduce the wear spots in the logical array 310. For example, the data from the overdriven fourth logical unit 305*d* of the logical array 310 may be migrated to a less-utilized ninth logical unit 305*i*. The volume relationship with the hosts 110 remains unchanged, although the location of the data of the logical unit 305 may be migrated to improve performance and better utilize the storage hierarchy as will be described hereafter.

Figure 4:
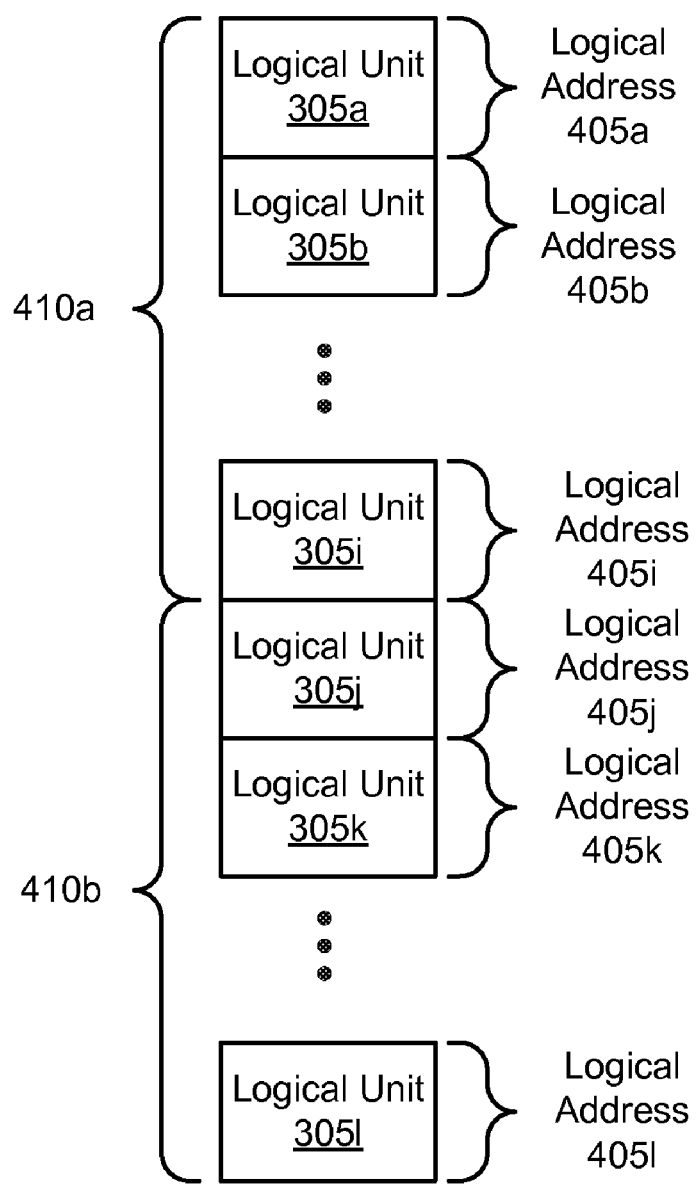
FIG. 4 is a schematic block diagram illustrating one embodiment of a pool of the plurality logical units of the present invention.

FIG. 4 is a schematic block diagram illustrating one embodiment of a pool 400 of the plurality of logical units 305 of the present invention. The pool 400 includes a plurality of logical volumes 410*a-b*. The description of the pool 400 refers to elements of FIGS. 1-3, like numbers referring to like elements. Although, for simplicity, the pool 400 is shown with two (2) logical volumes 410*a-b*, any number of logical volumes 410 may be employed.

In the shown embodiment, the logical units 305*a-i* and the logical units 305*j-l* are concatenated together to form a first logical volume 410*a* and a second logical volume 410*b* respectively. Each logical volume 410*a-b* may be configured as a virtual disk partition as is well known to those of skill in the art.

Each logical unit 305*a-l* has a logical address 405*a-l*. For example, a first logical unit 305*a* is shown to have a first logical address 405*a*, a second logical unit 305*b* is shown to have a second logical address 405*b*, and so on.

Each logical address 405*a-l* may be configured as a logical unit number (LUN). The LUN may be a number assigned to the logical unit 305. For example, the first logical unit 305*a* may have the logical address 405*a* represented as "LUNID=1."

Alternately, each logical address 405*a-l* may be logical block address (LBA). For example, the fourth logical unit 305*d* may have the logical address 405*d* represented as "LBA=4," if the fourth logical unit 305*d* stores one block of data.

In one more embodiment, the logical address 405*a-l* is configured as a logical extent number (LEN). For example, the tenth logical unit 305*j* may have the logical address 405*j* represented as "LEN=10."

Figure 5:
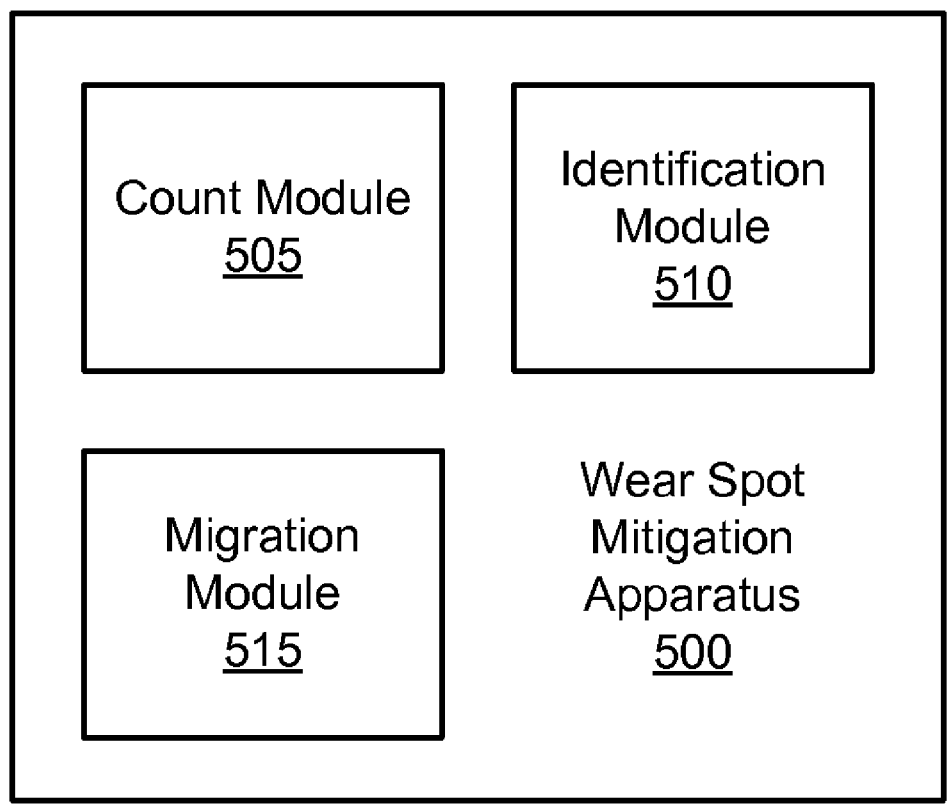
FIG. 5 is a schematic block diagram illustrating one embodiment of a wear spot mitigation apparatus of the present invention.

FIG. 5 is a schematic block diagram illustrating one embodiment of a wear spot mitigation apparatus 500 of the present invention. The description of the wear spot mitigation apparatus 500 refers to elements of FIGS. 1-4, like numbers referring to like elements. The wear spot mitigation apparatus 500 includes a count module 505, an identification module 510, and a migration module 515. The wear spot mitigation apparatus 500 may be embodied in a solid-state drive 170, a storage controller 160, or the like.

The count module 505 may comprise computer readable code stored on a tangible storage device such as a memory of a server 130. The code may be executed by a processor such as a server processor. Alternatively the code may be stored in memory of a storage controller 160 and executed by a storage controller processor. In one embodiment, the count module 505 is embodied in solid-state logic of a solid-state drive 170. The count module 505 counts lifetime write cycles for logical units 305 of a plurality of solid-state memories 210. Each logical unit 305 has a logical address 405.

The identification module 510 comprises computer readable code stored on the tangible storage device such as a memory of a server 130. The code may be executed by server processor. Alternatively the code may be stored in memory of a storage controller 160 and executed by a storage controller processor. In one embodiment, the identification module 510 is embodied in solid-state logic of a solid-state drive 170. The identification module 510 identifies a wear spot on a first logical unit 305*a* of a first solid-state memory 210*a* if a count for the first logical unit exceeds a cycle threshold as will be described hereafter.

The migration module 515 includes computer readable code stored on the tangible storage device and executed by the processor. In one embodiment, the code is stored on a server memory and executed by a server processor. Alternatively, the code is stored on a storage controller memory and executed by a storage controller processor. In one embodiment, the migration module 515 is embodied in solid-state logic of a solid-state drive 170. The migration module 515 dynamically migrates data of the first logical unit 305*a* to a second solid-state memory 210*b*. Data is continuously available at an original logical address 405*a* to the hosts 110.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
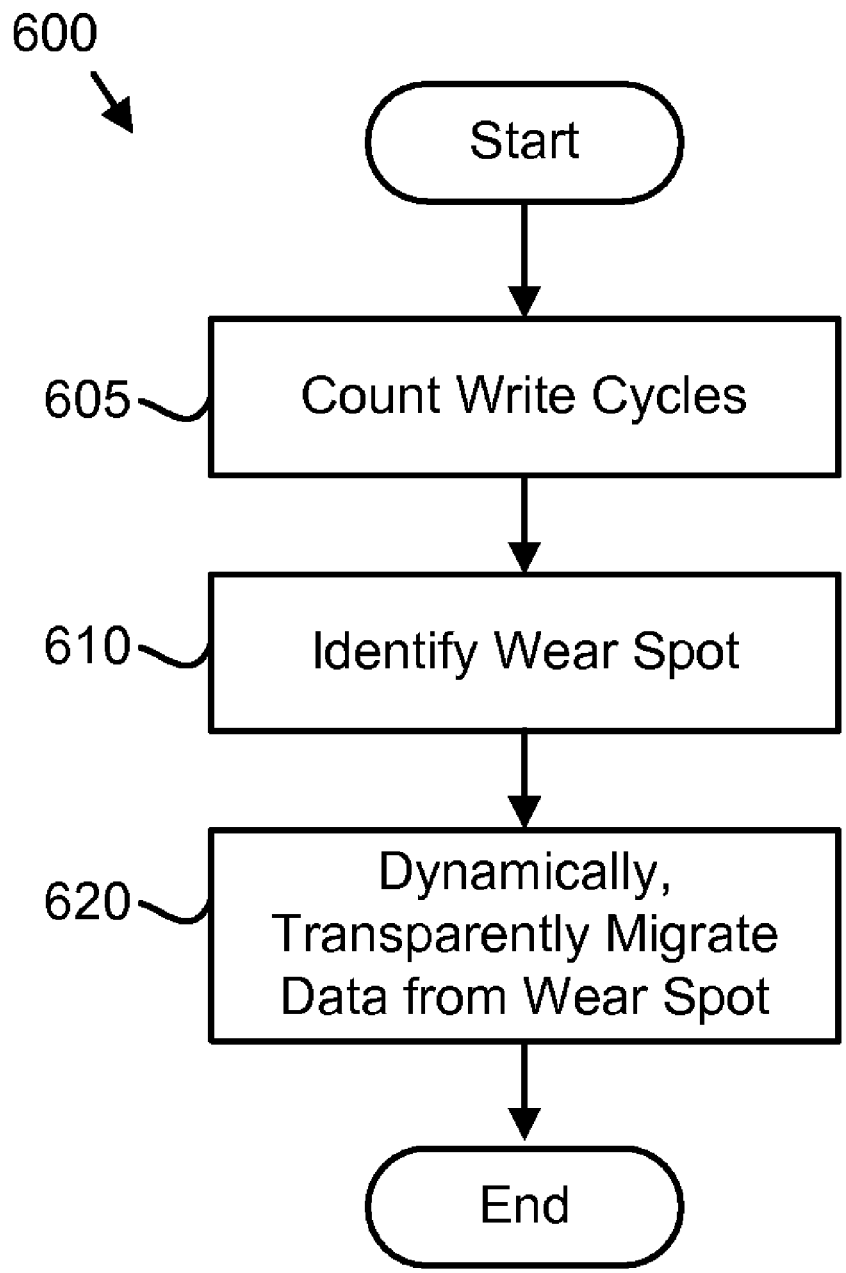
FIG. 6 is a schematic flow chart diagram illustrating one embodiment of a wear spot mitigation method of the present invention.

FIG. 6 is a schematic flow chart diagram illustrating one embodiment of a wear spot mitigation method 600 of the present invention. The method 600 substantially includes the steps to carry out the functions presented above with respect to the operation of the described apparatus 500 and system 100 of FIGS. 5 and 1 respectively. The description of the method 600 refers to elements of FIGS. 1-5, like numbers referring to like elements.

In one embodiment, the method 600 is implemented with a computer program product comprising a tangible computer readable medium having a computer readable program. The computer readable program may be executed by a processor of the solid-state drive 170, server 130 and/or storage controller 160, wherein the program in combination with the processor is capable of performing the method 600.

The wear spot mitigation method 600 begins and the count module 505 counts 605 lifetime write cycles for logical units 305*a-l* of the plurality of solid-state memories 210*a-f*. The count module 505 may employ a counter for each logical unit 305*a-l* to count 605 lifetime write cycles. For example, the count module 505 may automatically count 605 lifetime write ten thousand (10,000) cycles for the tenth logical unit 305*j*, one hundred thousand (100,000) cycles for the fifth logical unit 305*e*, and three hundred thousand one (300,001) cycles for the first logical unit 305*a* of the plurality of solid-state memories 210*a-f*.

The identification module 510 identifies 610 the wear spot on the first logical unit 305*a* of the first solid-state memory 210*a* if the count for the first logical unit 305*a* exceeds the cycle threshold. In one embodiment, the cycle threshold is the specified number of lifetime write cycles. For example, the cycle threshold may be the specified number of the value of three hundred thousand (300,000) of lifetime write cycles.

Any logical unit 305 may be the first logical unit 305*a* if the count for that particular logical unit 305 exceeds the cycle threshold. In addition, the solid-state drive 170 to which that particular logical unit 305 is linked may be considered as the first solid-state drive 170. Continuing with the example above, the identification module 510 may automatically detect lifetime write cycles of the value of three hundred thousand one (300,001) for the first logical unit 305*a* that exceeds the cycle threshold of the value of three hundred thousand (300,000) to identify 610 the wear spot on the first logical unit 305*a* of the first solid-state memory 210.

Alternately, the cycle threshold may be the specified percentage of the average of lifetime write cycles for all the logical units 305*a-l* in the plurality of solid-state memories 210*a-f*. For example, the cycle threshold may be thirty percent (30%) of the average of lifetime write cycles for all the logical units 305*a-l* in the plurality of solid-state memories 210*a-f*.

Continuing with the above example, the identification module 510 may automatically calculate the average of the lifetime write cycles of all the logical units 305*a-l* to find a value X and may further calculate thirty percent (130%) of the value X equal to another value Y. The cycle threshold may thus be the calculated value Y, wherein Y=(1.3)X. The identification module 510 may further compare the calculated cycle threshold with lifetime write cycles for each logical unit 305*a-l* to check if the lifetime write cycle for a particular logical unit 305 exceeds the cycle threshold of the value of Y.

The migration module 515 dynamically migrates 620 the data of the first logical unit 305a to the second solid-state memory 210b. Continuing with the above example, the migration module 515 may dynamically migrate 620 the data in the form of blocks of data of the first logical unit 305a to the second solid-state memory 210b in response to the identification module 510 identifying 610 the wear spot on the first logical unit 305a.

Each logical unit 305 has a logical address 405. Each logical address 405 may be the logical address 405a-k as described for the description of FIG. 4. The data is continuously available at an original logical address.

Thus, the migration may be transparent to the hosts 110 and data of the first logical unit 305a is continuously available to the hosts 110 at the first logical address 405a. For example, while the data of the first logical unit 305a is migrated to a less-utilized second solid-state memory 210b, the data of the first logical unit 305a remains available to the hosts 110 at the first logical address 405a.

The migration module 515 may dynamically migrate 620 the data of the first logical unit 305a using a Flash Copy algorithm. The Flash Copy algorithm may support instantaneous access, write, or erase for the data on the new rank while it is being copied from the old set of ranks.

In one embodiment, the Flash Copy algorithm makes a second image of data available. The Flash Copy algorithm is sometimes known in other system contexts as Point-In-Time copy, or T0-copy. The second image's contents are initially identical to that of the first. Changed data is also copied to the second image. The second image is made available 'instantly.' In practical terms this means that the second image is made available in much less time than would be required to create a true, separate, physical copy, and can be established without unacceptable disruption to a using application.

In a particular example, the data of the first logical unit 305a may be migrated from the first solid-state drive 170a to the fifth solid-state drive 170e. The volume relationship with the hosts 110 remains unchanged. However, the physical location of the data of the first logical unit 305a may migrate to reduce wear spot concentration.

Alternately, in an embodiment, the migration module 515 dynamically a migrates 620 the data of the first logical unit 305a using a Redundant Array of Independent Disks (RAID) mirroring algorithm. The RAID mirroring algorithm may employ RAID1 level processes to create an exact copy or mirror of the set of data as is well known to those of skill in the art. For example, the migration module 515 may use the RAID1 level processes to mirror the blocks of the data of the first logical unit 305a to second solid-state memory 210b. Thus, the present invention identifies the wear spot on the first logical unit 305a and relocates the data of the identified first logical unit 305a to another physical location.

Figure 7:
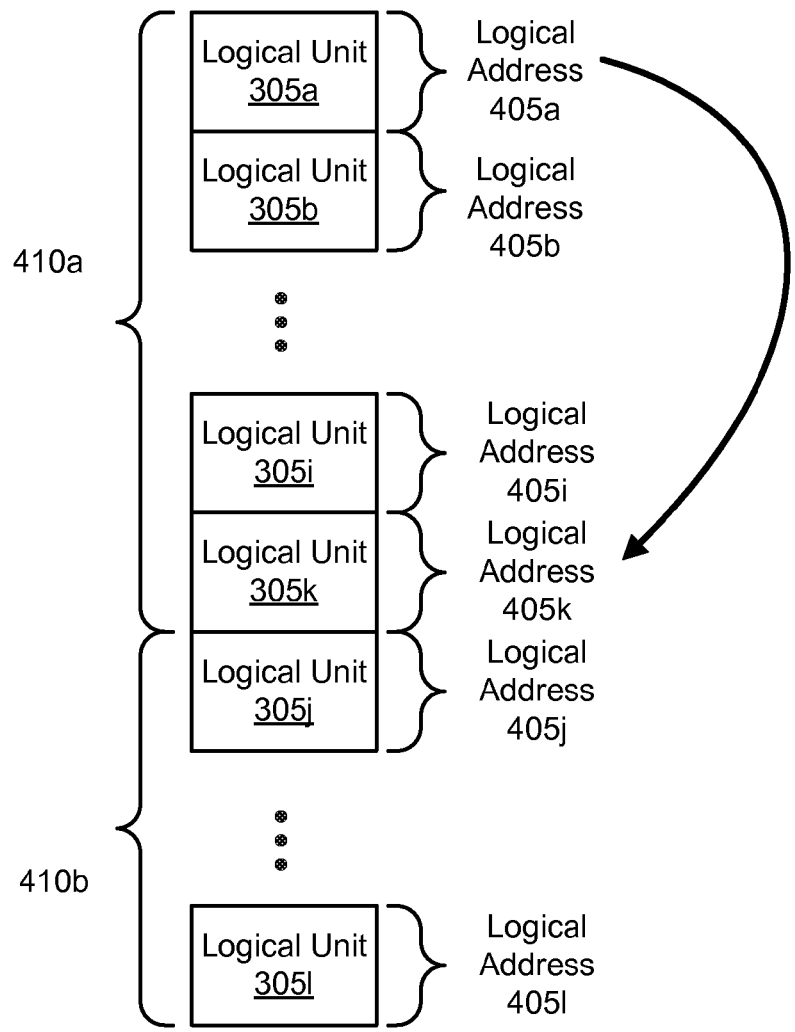
FIG. 7 is a schematic block diagram illustrating one embodiment of migrating a logical unit.

FIG. 7 is a schematic block diagram illustrating one embodiment a migrating 700 a logical unit 305, wherein a first logical unit 305a with a wear spot migrates to a second solid-state memory 210b, of the present invention. The description of the migrating 700 the logical unit 305 refers to elements of FIGS. 1-6, like numbers referring to like elements. In particular, the description of the migrating 700 the logical unit 305 refers to the description of the FIG. 4.

In the shown embodiment, the data of the first logical unit 305a migrates from the first logical unit 305a of the first logical volume 410a to eleventh logical unit 305k. The eleventh logical unit 305k may be reassigned to the second logical volume 410b. The logical units 305a-i and 305k and the logical units 305j and 305-l are shown concatenated together to form the first logical volume 410a and the second logical volume 410b respectively. In addition, the logical units 305a-i and the logical units 305j-l may be on distinct solid-state memories 210.

Further, the first logical unit 305a is shown to have the first logical address 405a, the second logical unit 305b is shown to have the second logical address 405b, and so on. In a particular example, the first logical unit 305a and the eleventh logical unit 305k may have the first logical address 405a represented as "LUNID=1" and the eleventh logical address 405k represented as "LUNID=11."

The count module 505 might count 605 lifetime write cycles of the value of three hundred thousand one (300,001) and one hundred (100) for the first logical unit 305a and the eleventh logical unit 305k respectively. The identification module 510 might identify 610 the wear spot on the first logical unit 305a of the first solid-state memory 210a since the lifetime write cycles of three hundred thousand one (300,001) cycles for the first logical unit 305a exceeds the cycle threshold of the value of three hundred thousand (300,000) cycles.

The migration module 515 dynamically migrates 620 the data of the first logical unit 305a of the first solid-state memory 210b to the eleventh logical unit 305k of the second solid-state memory 210b in response to the identification module 510 identifying 610 the wear spot on the first logical unit 305a. The migration 620 of the data is shown with a curved arrow.

Thus, the present invention may reduce wear spots by migrating the data to a new different physical location, while the data is still available on the original location. The volume relationship with the hosts 110 remains unchanged.

The present invention identifies wear spots in a first solid-state memory 210a. On identification of the wear spots, the present invention migrates the data of the first solid-state memory 210a to a second solid-state memory 210b. Thus, the present invention would beneficially extend life of one or more solid-state drives 170 of a DPS 100. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer useable medium having a computer readable program stored on a tangible storage device, wherein the computer readable program when executed on a computer causes the computer to:

count lifetime write cycles for logical units of a plurality of solid-state memories, wherein each logical unit has a logical address;

identify a wear spot on a first logical unit of a first solid-state memory if a count of each write for the first logical unit exceeds a cycle threshold; and dynamically migrate data of the first logical unit to a second solid-state memory in response to identifying the wear spot, else writing the data of the first logical unit to the first logical unit, wherein the data is continuously available at an original logical address.

2. The computer program product of claim 1, wherein each logical unit is configured as a solid-state drive logical block address.

3. The computer program product of claim 1, wherein each logical unit is configured as an array logical block address.

4. The computer program product of claim 1, wherein each logical unit is configured as a logical volume.

5. The computer program product of claim 1, wherein each logical unit is configured as an extent.

6. The computer program product of claim 1, wherein the cycle threshold is a specified number of lifetime write cycles.

7. The computer program product of claim 1, wherein the cycle threshold is a specified percentage of an average of counts for lifetime write cycles of all logical units in the plurality of solid-state memories.

8. The computer program product of claim 1, wherein the computer readable program is further configured to cause the computer to dynamically migrate the data using a flash copy algorithm.

9. The computer program product of claim 1, wherein the computer readable program is further configured to cause the computer to dynamically migrate the data using a Redundant Array of Independent Disks (RAID) mirroring algorithm.

10. An apparatus to migrate wear spots, the apparatus comprising:
    a tangible storage device storing a computer readable program executable on a processor, the computer readable program comprising:
    a count module configured to count lifetime write cycles for logical units of a plurality of solid-state memories, wherein each logical unit has a logical address;
    an identification module configured to identify a wear spot on a first logical unit of a first solid-state memory if a count of each write for the first logical unit exceeds a cycle threshold; and
    a migration module configured to dynamically migrate data of the first logical unit to a second solid-state memory in response to identifying the wear spot, else writing the data of the first logical unit to the first logical unit, wherein the data is continuously available at an original logical address.

11. The apparatus of claim 10, wherein each logical unit is configured as a solid-state drive logical block address.

12. The apparatus of claim 10, wherein each logical unit is configured as an array logical block address.

13. The apparatus of claim 10, wherein each logical unit is configured as a logical volume.

14. The apparatus of claim 10, wherein each logical unit is configured as an extent.

15. A system to migrate wear spots, the system comprising:
    a plurality of solid-state memories;
    a tangible storage device storing a computer readable program executable on a processor, the computer readable program comprising:
    a count module configured to count lifetime write cycles for logical units of the plurality of solid-state memories, wherein each logical unit has a logical address;
    an identification module configured to identify a wear spot on a first logical unit of a first solid-state memory if a count of each write for the first logical unit exceeds a cycle threshold; and
    a migration module configured to dynamically migrate data of the first logical unit to a second solid-state memory in response to identifying the wear spot, else writing the data of the first logical unit to the first logical unit, wherein the data is continuously available at an original logical address.

16. The system of claim 15, wherein the cycle threshold is a specified number of lifetime write cycles.

17. The system of claim 15, wherein the cycle threshold is a specified percentage of an average of counts for lifetime write cycles of all logical units in the plurality of solid-state memories.

18. The system of claim 15, wherein the migration module dynamically migrates the data using a flash copy algorithm.

19. The system of claim 15, wherein the migration module dynamically migrates the data using a RAID mirroring algorithm.

20. A method for deploying computer infrastructure, comprising integrating a computer readable program stored on a tangible storage device into a computing system, wherein the program in combination with the computing system performs the following:
    counting lifetime write cycles for logical units of a plurality of solid-state memories, wherein each logical unit has a logical address;
    identifying a wear spot on a first logical unit of a first solid-state memory if a count of each write for the first logical unit exceeds a cycle threshold, wherein the cycle threshold is a specified percentage of an average of counts for lifetime write cycles of all logical units in the plurality of solid-state memories; and
    dynamically migrating data of the first logical unit to a second solid-state memory in response to identifying the wear spot, else writing the data of the first logical unit to the logical unit, wherein the data is continuously available at an original logical address.

* * * * *